(12) United States Patent
Kucherov et al.

(10) Patent No.: US 10,255,172 B1
(45) Date of Patent: Apr. 9, 2019

(54) CONTROLLED TESTING USING CODE ERROR INJECTION

(71) Applicant: EMC IP Holding Company LLC, Hopkinton, MA (US)

(72) Inventors: Anton Kucherov, Milford, MA (US); Gilad Braunschvig, Tel Aviv (IL); Leron Fliess, Herzliya (IL)

(*) Notice: Subject to any disclaimer, the term of this patent is extended or adjusted under 35 U.S.C. 154(b) by 0 days.

(21) Appl. No.: 15/282,546

(22) Filed: Sep. 30, 2016

(51) Int. Cl.
G06F 9/44 (2018.01)
G06F 11/36 (2006.01)
G06F 8/70 (2018.01)

(52) U.S. Cl.
CPC ............ G06F 11/3688 (2013.01); G06F 8/70 (2013.01)

(58) Field of Classification Search
CPC ................................................ G06F 11/3688
USPC ......................................................... 717/130
See application file for complete search history.

(56) References Cited

U.S. PATENT DOCUMENTS

| | | | |
|---|---|---|---|
| 5,204,958 A | 4/1993 | Cheng et al. | |
| 6,085,198 A | 7/2000 | Skinner et al. | |
| 6,125,399 A | 9/2000 | Hamilton | |
| 6,477,666 B1* | 11/2002 | Sanchez ............... | G06F 11/3688 714/38.12 |
| 6,671,694 B2 | 12/2003 | Baskins et al. | |
| 7,203,796 B1 | 4/2007 | Muppalaneni et al. | |
| 7,472,249 B2 | 12/2008 | Cholleti et al. | |
| 7,908,484 B2 | 3/2011 | Haukka et al. | |
| 8,386,425 B1 | 2/2013 | Kadayam et al. | |
| 8,386,433 B1 | 2/2013 | Kadayam | |
| 8,799,705 B2 | 8/2014 | Hallak et al. | |
| 9,104,326 B2 | 8/2015 | Frank et al. | |
| 9,367,398 B1 | 6/2016 | Ben-Moshe et al. | |
| 9,442,941 B1 | 9/2016 | Luz et al. | |
| 9,703,789 B2 | 7/2017 | Bowman et al. | |
| 2003/0061227 A1 | 3/2003 | Baskins et al. | |
| 2003/0106045 A1* | 6/2003 | Arnold ................ | G06F 11/3644 717/129 |
| 2004/0153818 A1* | 8/2004 | Woodall ............... | G06F 9/3891 714/37 |
| 2004/0267835 A1 | 12/2004 | Zwilling et al. | |
| 2006/0271540 A1 | 11/2006 | Williams | |

(Continued)

FOREIGN PATENT DOCUMENTS

JP    2014-206884    10/2014

OTHER PUBLICATIONS

Hsueh et al., "Fault injection techniques and tools", Apr. 1997, IEEE, pp. 75-82 (Year: 1997).*

(Continued)

*Primary Examiner* — Wei Y Zhen
*Assistant Examiner* — Lanny N Ung
(74) *Attorney, Agent, or Firm* — Daly, Crowley Mofford & Durkee, LLP

(57) ABSTRACT

A computer program product, system, and method for: registering one or more agents within a program, wherein each agent is located along an execution path of the program and is configured to change the program's internal state; and executing at least one of the agents located along a first path in response to the program executing the first path. In some embodiments, executing the at least one of the agents includes changing internal data of the program and/or causing the program to execute varying amounts of data on the first path.

13 Claims, 4 Drawing Sheets

(56) References Cited

U.S. PATENT DOCUMENTS

| | | | | |
|---|---|---|---|---|
| 2007/0240125 | A1* | 10/2007 | Degenhardt | G06F 11/3632 717/129 |
| 2008/0082969 | A1* | 4/2008 | Agha | G06F 11/3608 717/130 |
| 2008/0235793 | A1 | 9/2008 | Schunter et al. | |
| 2009/0216953 | A1 | 8/2009 | Rossi | |
| 2010/0005233 | A1 | 1/2010 | Hosokawa | |
| 2010/0250611 | A1 | 9/2010 | Krishnamurthy | |
| 2011/0087854 | A1 | 4/2011 | Rushworth et al. | |
| 2011/0137916 | A1 | 6/2011 | Deen et al. | |
| 2011/0302587 | A1 | 12/2011 | Nishikawa et al. | |
| 2012/0023384 | A1 | 1/2012 | Naradasi et al. | |
| 2012/0124282 | A1 | 5/2012 | Frank et al. | |
| 2012/0158736 | A1 | 6/2012 | Milby | |
| 2012/0204077 | A1 | 8/2012 | D'Abreu et al. | |
| 2012/0233432 | A1 | 9/2012 | Feldman et al. | |
| 2013/0036289 | A1 | 2/2013 | Welnickka et al. | |
| 2013/0212074 | A1 | 8/2013 | Romanski et al. | |
| 2013/0290285 | A1 | 10/2013 | Gopal et al. | |
| 2013/0318053 | A1 | 11/2013 | Provenzano et al. | |
| 2013/0326318 | A1 | 12/2013 | Haswell | |
| 2013/0346716 | A1 | 12/2013 | Resch | |
| 2014/0019764 | A1 | 1/2014 | Gopal et al. | |
| 2014/0032992 | A1 | 1/2014 | Hara et al. | |
| 2014/0122823 | A1 | 5/2014 | Gupta et al. | |
| 2014/0244598 | A1 | 8/2014 | Haustein et al. | |
| 2015/0019507 | A1 | 1/2015 | Aronovich | |
| 2015/0098563 | A1 | 4/2015 | Gulley et al. | |
| 2015/0149769 | A1 | 5/2015 | Seo et al. | |
| 2015/0186215 | A1 | 7/2015 | Das Sharma et al. | |
| 2015/0199244 | A1 | 7/2015 | Venkatachalam et al. | |
| 2015/0205663 | A1 | 7/2015 | Sundaram et al. | |
| 2016/0011941 | A1 | 1/2016 | He et al. | |
| 2016/0110252 | A1 | 4/2016 | Hyun et al. | |
| 2016/0132270 | A1 | 5/2016 | Miki | |
| 2017/0123995 | A1 | 5/2017 | Freyensee et al. | |
| 2017/0255515 | A1 | 9/2017 | Kim et al. | |

OTHER PUBLICATIONS

U.S. Non-Final Office Action dated Feb. 9, 2017 for U.S. Appl. No. 14/228,971; 38 Pages.
Response to Office Action dated Jun. 2, 2017 from U.S. Appl. No. 15/079,208 filed Sep. 5, 2017; 10 Pages.
U.S. Non-Final Office Action dated Oct. 4, 2017 for U.S. Appl. No. 14/228,971; 37 pages.
U,S, Non-Final Office Action dated Nov. 13, 2017 for U.S. Appl. No. 15/079,213; 9 pages.
Notice of Allowance dated Sep. 22, 2017 for U.S. Appl. No. 15/079,215; 9 Pages.
Response (w/RCE) to U.S. Final Office Action dated Jun. 20, 2017 for U.S. Appl. No. 14/228,971; Response filed Sep. 13, 2017; 14 Pages.
U.S. Non-Final Office Action dated Apr. 21, 2017 for U.S. Appl. No. 15/079,215; 53 Pages.
Response to U.S. Non-Final Office Action dated Feb. 9, 2017 for U.S. Appl. No. 14/228,971; Response filed May 9, 2017; 12 Pages.
U.S. Appl. No. 14/228,971, filed Mar. 28, 2014, Shoikhet et al.
U.S. Appl. No. 14/979,890, filed Dec. 28, 2015, Meiri et al.
U.S. Appl. No. 15/079,205, filed Mar. 24, 2016, Dorfman et al.
U.S. Appl. No. 15/079,208, filed Mar. 24, 2016, Ben-Moshe et al.
U.S. Appl. No. 15/079,213, filed Mar. 24, 2016, Ben-Moshe et al.
U.S. Appl. No. 15/079,215, filed Mar. 25, 2016, Krakov et al.
U.S. Appl. No. 15/281,593, filed Sep. 30, 2016, Braunschvig et al.
U.S. Appl. No. 15/281,597, filed Sep. 30, 2016, Bigman.

U.S. Office Action dated Aug. 27, 2015 corresponding to U.S. Appl. No. 14/228,971; 23 Pages.
Response to U.S. Office Action dated Aug. 27, 2015 corresponding to U.S. Appl. No. 14/228,971; Response filed Jan. 14, 2016; 10 Pages.
U.S. Final Office Action dated Feb. 25, 2016 corresponding to U.S. Appl. No. 14/228,971; 27 Pages.
Request for Continued Examination (RCE) and Response to Final Office Action dated Feb. 25, 2016 corresponding to U.S. Appl. No. 14/228,971; Response filed May 25, 2016; 12 Pages.
U.S. Office Action dated Jun. 10, 2016 corresponding to U.S. Appl. No. 14/228,971; 27 Pages.
Response to U.S. Office Action dated Jun. 10, 2016 corresponding to U.S. Appl. No. 14/228,971; Response filed Aug. 17, 2016; 10 Pages.
U.S. Final Office Action dated Oct. 4, 2016 corresponding to U.S. Appl. No. 14/228,971; 37 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed on Feb. 1, 2016; 10 Pages.
Notice of Allowance dated Apr. 26, 2016 corresponding to U.S. Appl. No. 14/228,982; 9 Pages.
U.S. Office Action dated Jan. 12, 2016 corresponding to U.S. Appl. No. 14/229,491; 12 Pages.
Response to Office Action dated Jan. 12, 2016 corresponding to U.S. Appl. No. 14/229,491; Response filed Jun. 2, 2016; 7 Pages.
Notice of Allowance dated Jul. 25, 2016 corresponding to U.S. Appl. No. 14/229,491; 10 Pages.
EMC Corporation, "Introduction to the EMC XtremIO Storage Array;" Version 4.0; White Paper—A Detailed Review; Apr. 2015; 65 Pages.
Vijay Swami, "XtremIO Hardware/Software Overview & Architecture Deepdive;" EMC On-Line Blog; Nov. 13, 2013; Retrieved from <http://vjswami.com/2013/11/13/xtremio-hardwaresoftware-overview-architecture-deepdive/>; 18 Pages.
U.S. Final Office Action dated Jun. 20, 2017 for U.S. Appl. No. 14/228,971; 40 Pages.
Response to U.S. Non-Final Office Action dated Apr. 21, 2017 for U.S. Appl. No. 15/079,215; Response filed Jul. 21, 2017; 9 Pages.
Request for Continued Examination (RCE) and Response to Final Office Action dated Oct. 4, 2016 corresponding to U.S. Appl. No. 14/228,971; RCE and Response filed Jan. 4, 2017; 19 Pages.
U.S. Non-Final Office Action dated Jun. 2, 2017 for U.S. Appl. No. 15/079,208; 19 Pages.
U.S. Final Office Action dated May 29, 2018 for U.S. Appl. No. 14/228,971; 35 pages.
U.S. Non-Final Office Action dated May 31, 2018 for U.S. Appl. No. 15/281,593; 10 pages.
U.S. Non-Final Office Action dated Dec. 1, 2017 for U.S. Appl. No. 14/979,890; 10 Pages.
U.S. Non-Final Office Action dated Nov. 28, 2017 corresponding to U.S. Appl. No. 15/079,205; 9 Pages.
U.S. Non-Final Office Action dated Dec. 29, 2017 corresponding to U.S. Appl. No. 15/079,208; 10 Pages.
Response to U.S. Non-Final Office Action dated Nov. 13, 2017 for U.S. Appl. No. 15/079,213; Response filed Feb. 13, 2018; 9 Pages.
Response to U.S. Non-Final Office Action dated Nov. 28, 2017 for U.S. Appl. No. 15/079,205; Response filed Feb. 28, 2018; 11 Pages.
Response to U.S. Non-Final Office Action dated Dec. 1, 2017 for U.S. Appl. No. 14/979,890; Response filed Feb. 28, 2018; 9 Pages.
Response to U.S. Non-Final Office Action dated Dec. 29, 2017 for U.S. Appl. No. 15/079,208; Response filed Apr. 30, 2018; 7 Pages.

* cited by examiner

CONTROLLED TESTING USING CODE ERROR INJECTION

BACKGROUND

In complex systems, such as storage arrays and other distributed systems, there may be a set of events (e.g., fault or error conditions) that occur infrequently during normal operation. For example, race conditions may infrequently occur between multiple threads or processes. Such rare situations may take years of testing and quality assurance to identify, recreate, and validate a fix for. Moreover, isolating offending code may be ineffective to recreate/fix problems that only occur as a result of multi-process, multi-host, or multi-system interaction.

One approach for reaching infrequent error conditions is running storage systems for a long time until the rare scenario is eventually reached while introducing the external factors that lead to it (e.g., removing disks from a storage array).

SUMMARY

Some embodiments of the disclosure make it possible to identify and reproduce infrequent error conditions faster and in a deterministic manner. Many embodiments of the disclosure enable reliably recreating infrequent fault conditions within a complex system by externally changing a program's internal state. Certain embodiments of the disclosure allow for collecting information on which program paths (or "flows") are taken, and for generating flow charts describing the system's behavior.

According to one aspect of the disclosure a method comprises: registering one or more agents within a program, wherein each agent is located along an execution path of the program and is configured to change the program's internal state; and executing at least one of the agents located along a first path in response to the program executing the first path.

In some embodiments, executing the at least one of the agents includes changing internal data of the program. In certain embodiments, executing the at least one of the agents includes causing the program to execute varying amounts of data on the first path. In many embodiments, executing the at least one of the agents includes causing the program to execute a second path different from the first path. In some embodiments, executing the at least one of the agents includes executing a callback function associated with the agent, wherein the callback function is configured to change internal data of the program and to cause the program to execute a second path different from the first path.

In particular embodiments, each of the agents has a current state and executing the at least one of the agents comprises changing the program's internal state based upon the agent's current state. In some embodiments, the method further comprises: receiving a request to change an agent's current state to a new state; and updating the agent's current state to the new state, wherein the request is generated externally from the program.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
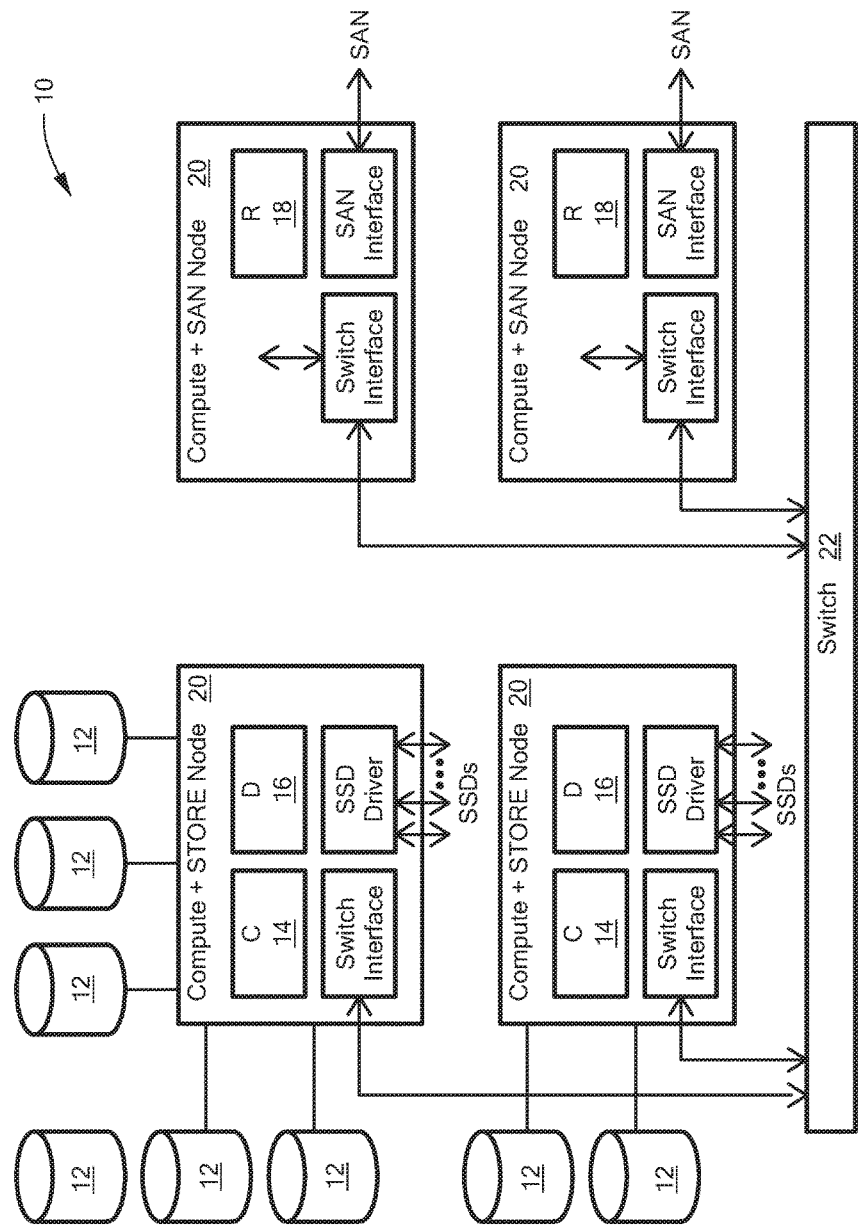
FIG. 1 is a block diagram of a data storage system, according to one embodiment of the disclosure.

Referring to the embodiment of FIG. 1, a data storage system 10 includes a plurality of nodes 20 connected over a network by a switch 22. The system 10 includes data storage devices 12 on which data blocks are stored. Each node 20 includes one or more computing modules, such as control modules ("C") 14, data modules ("D") 16, and routing modules ("R"). In many embodiments, a given node may include at least one of a routing, control, or data module. In certain embodiments, a node may include a multiplicity of any or all of these modules.

Referring again to FIG. 1, the storage devices 12 are networked to computing modules, including control modules 14 and data modules 16. The control modules 14 control execution of read and write commands. The data modules 16 are connected to the storage devices 12 and, under control of a respective control module 14, pass data to or from the storage devices 12.

Routing modules 18 route processing throughout the system 10. In some embodiments, routing modules may terminate storage and retrieval operations and distribute command parts of any operations to control modules that are explicitly selected for the operation in such a way as to retain balanced usage within the system.

In certain embodiments, the computing modules (e.g., data, control, and/or routing modules) may include executable computer code configured to perform processing described below in conjunction with FIGS. 2 and 3.

In some embodiments, the computing modules carry out content addressing for storage and retrieval. In certain embodiments, control and data modules may retain extracts of the data stored in the storage device, and the extracts may be used for the content addressing. In many embodiments, the extracts may be computed by cryptographic hashing of the data, e.g., the modules may calculate hash values for data that are the subject of I/O commands, and the hash values may later be used for retrieval. In some embodiments, the term "I/O request" or simply "I/O" may be used to refer to an input or output request. In many embodiments, an I/O request may refer to a data read or write request. In particular embodiments, hashing used for the content addressing produces evenly distributed results over the allowed input range. In some embodiments, the hashing defines the physical addresses so that data storage makes even use of the system resources.

In certain embodiments, data is stored in blocks, where each block has a unique large hash signature. In some embodiments, relatively small granularity may be used for blocks, for example with a block size of 4 KB, although smaller or larger block sizes may be selected. In many embodiments, a user I/O request larger than 4 KB or other system-determined block size may be converted into a plurality of I/O operations within the system, each one separately hashed and separately processed.

In particular embodiments, data blocks are stored to solid-state disks (SSDs). In some embodiments, a data storage system is a flash-based key/value cluster storage array. In some embodiments, the storage devices may include solid-state random access storage devices. In other embodiments, the storage devices may include spinning disk devices.

In some embodiments, content addressable storage (CAS) can be used to ensure that data appearing twice is stored at the same location (e.g., to identity and avoid duplicate write operations). In many embodiments, CAS can be used to provide de-duplication within a data storage system, meaning ensuring that the same data is not stored twice in different places.

In some embodiments, the separation of control and data may enable a substantially unlimited level of scalability, since control operations can be split over any number of processing elements, and data operations can be split over any number of data storage elements. In many embodiments, the separation of control and data may provide one or more of the following: (a) parallel operation of certain control and data actions over multiple nodes/modules; (b) use of optimal internal communication/networking technologies per the type of operation (control or data), designed to minimize the latency (delay) and maximize the throughput of each type of operation.

In many embodiments, routing modules may use hash values, calculated from data associated with the operations, to select the control module for the distribution. In certain embodiments, a control module may be selected based on a user-specified address. In many embodiments, the hash value may be used for selecting the data module, and for setting the physical location for data storage within the data module. In some embodiments, the routing modules and/or data modules may provide deduplication by comparing the extracts or hash values of write data with hash values of already stored data, and where a match is found, simply point to the matched data and avoid rewriting.

In various embodiments, routing modules decouple data storage patterns from I/O patterns. In some embodiments, a routing module may break up incoming blocks that are larger than a given granularity size and send the relevant parts to the appropriate control modules. In many embodiments, a control module may handle a range or set of addresses within a logical unit (LU). In particular embodiments, a control module may break up a block it receives for distribution to data modules, at a pre-determined granularity. In one embodiment, a request to write a sixty-four (64) KB block may end up being broken up into sixteen (16) internal writes, each write comprising a four (4) KB block.

Figure 2:
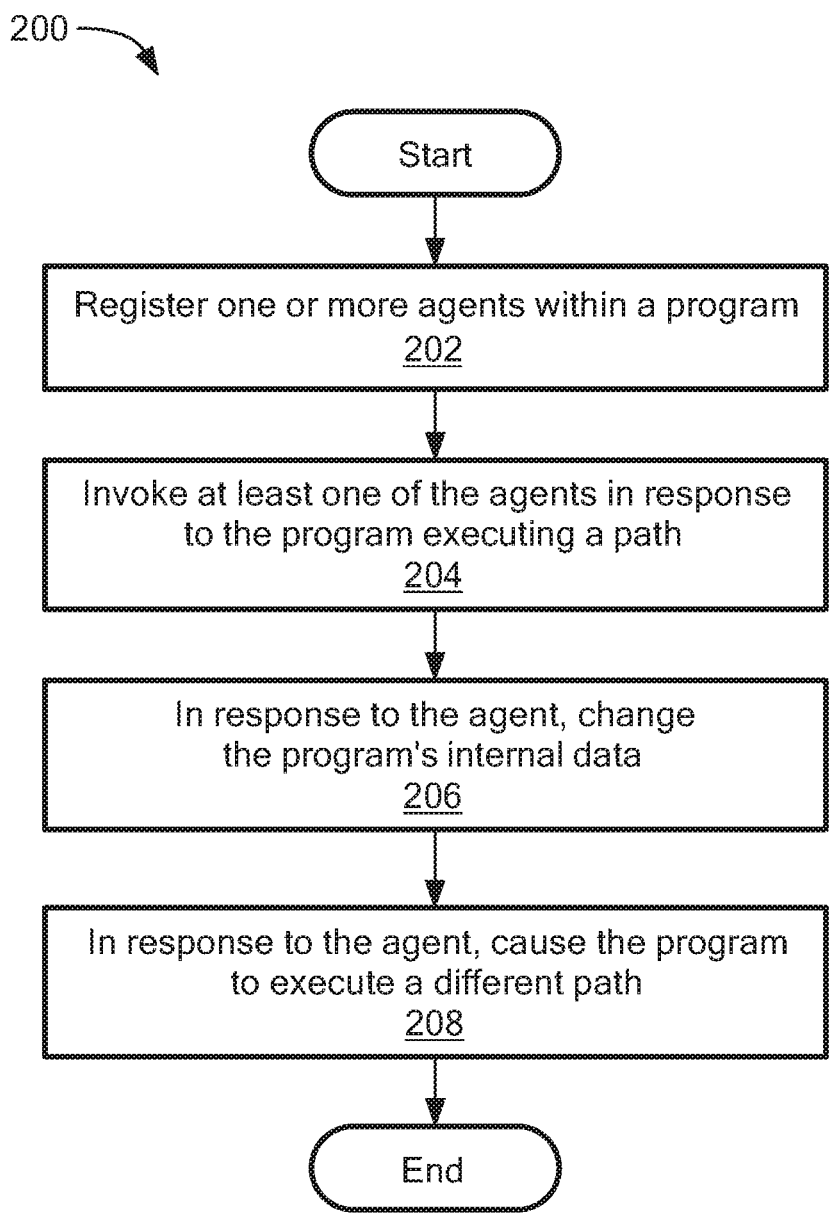
FIGS. 2 and 3 are flow diagrams illustrating processing that may occur within a storage system node, in accordance with embodiments of the disclosure.
Figure 3:
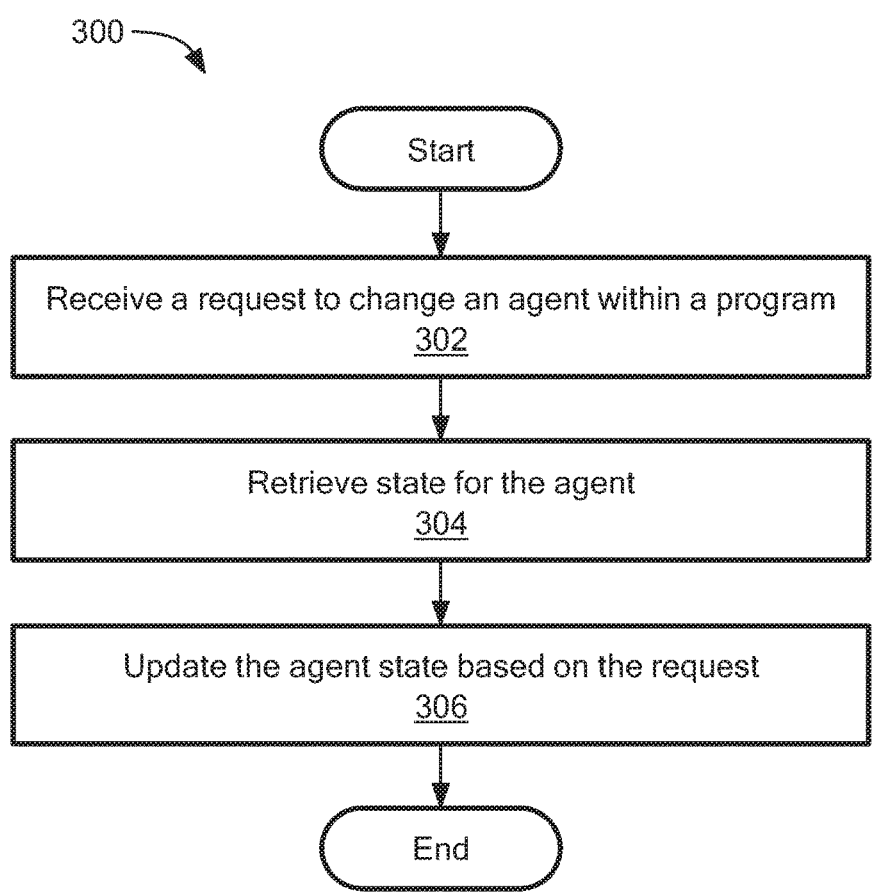

FIGS. 2 and 3 are flow diagrams showing illustrative processing, according to embodiments of the disclosure. In some embodiments, rectangular elements (typified by element 202 in FIG. 2), herein denoted "processing blocks," represent computer software instructions or groups of instructions. In other embodiments, processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to the embodiment of FIG. 2, a method 200 can be used to change the internal state of a program. In some embodiments, the program may be a computer program (or "process") executing on a processor. In certain embodiments, the program may be part of a data storage system. In one embodiment, the program may correspond to a control, data, or routing module within a data storage system.

Referring again to FIG. 2, at block 202, one or more agents are registered within the program. In many embodiments, the agents can be dynamically re-configured from an external program, meaning a program that does not have access to the subject program's internal state. In certain embodiments, the agents can be re-configured from a host that is remote from the host on which the program is running.

Referring back to FIG. 2, at block 204, at least one of the agents is invoked in response to program execution. In many embodiments, invoking the agent may cause the program's internal state to be changed. In some embodiments, invoking the agent may cause the program's internal data to be changed. In certain embodiments, invoking the agent may cause the program's control flow to be changed from the first path to a second path. In particular embodiments, invoking the agent may include executing a callback function associated with the agent. In certain embodiments, the callback function may change the program's internal data. In some embodiments, the callback function may cause the program to execute a different path. In various embodiments, the agent may have a current state that is used to determine how the agent changes the program's internal state.

In particular embodiments, program source code can be augmented to place agents along desired paths. In many embodiments, agents may be placed at branch points (e.g., "if" and "while" statements) in order to control program branching and, thus, program flow. In some embodiments, branch conditionals (e.g., a conditional expression within an "if" or "while" statement) can be wrapped in a designated macro or function call (referred to herein as a "wrapper") such that a designated agent is invoked when the branch conditional is evaluated. In many embodiments, when the wrapper is invoked, it causes a callback function associated with the designated agent to be executed; after the callback function returns, the wrapper may cause the program's flow to be altered based on the callback functions return value. In certain embodiments, the original branch conditional may be passed as a parameter to the wrapper. In some embodiments, a unique identifier may be passed as a parameter to the wrapper to designate the agent to be invoked. In some embodiments, arbitrary internal program data may be passed as a parameter to the wrapper to such that it can be altered by the callback function. In certain embodiments, program data may include page data, I/O data, or other data used within a data storage system.

In one embodiment, the wrapper may have the following syntax:
WRAP(cond, agent_id, data),
where "cond" is branch conditional or other expression that can be evaluated to a boolean value, "agent_id" is a unique identifier for the agent to be invoked, and "data" is arbitrary program data.

In certain embodiments, the wrapper may be implemented as a macro that can be conditionally enabled or disabled during program compilation. In particular embodiments, wrappers may be enabled when the program is compiled for testing, and disabled when the program is compiled for normal use. In many embodiments, when the macro is enabled, the wrapper may invoke the designated agent, but if the macro is disabled, the macro may simply evaluate to "cond" (i.e., the macro is a no-op).

In one embodiment, the macro may be defined using the following syntax:
ifdef USE_WRAPPERS
define WRAP(cond, agent_id, data) run_agent(cond, agent_id, data)
else
define WRAP(cond, agent_id, data) cond
endif,
where "run_agent" is a function that locates the agent using the unique identifier ("agent_id") and invokes the agent. In some embodiments, invoking the agent may include invoking a callback function, with the result of the boolean expression ("cond") and the program data ("data") passed as parameters.

In many embodiments, agents may be registered in a lookup table, indexed by their unique id ("agent_id"). In certain embodiments, the lookup table may include, for each registered agent, a current state and a reference to a callback function (e.g., a function pointer). In various embodiments, the current state of the agent (or some data structure holding the current state) may be passed as a parameter to the callback function. In some embodiments, the program data and/or the agent's current state may be passed by reference to the callback function such that the callback function can manipulate these values.

In one embodiment, an agent's callback function has the following signature:
bool some_callback(agent_t*agent, bool cond, void*data);
where "agent" is a reference to a data structure holding the agent's current state, "cond" is the result of the evaluated boolean expression, and "data" corresponds to the arbitrary internal program data.

In some embodiments, the agent's current state is an enumerated value. In a particular embodiment, the agent's current state may be one of DO_NOTHING, ONE_TIME_ERROR, RANDOM_FALSE_POSITIVES, and CONTINUOUS_ERRORS. In certain embodiments, if an agent's current state equals DO_NOTHING, the agent simply returns the value of the evaluated expression. In some embodiments, if the agent's current state equals ONE_TIME_ERROR, the agent changes the program data in such a way to simulate an error and also changes its current state to DO_NOTHING; the agent may return false to indicate an error condition. In certain embodiments, if the agent's current state equals RANDOM_FALSE_POSI- TIVES, the agent may or may not change the program data to simulate an error, depending upon some random event; if the program data is changed, the agent may return true to indicate no error, thus simulating random false positives within the program. In particular embodiments, if the agent's current state equals CONTINUOUS_ERRORS, the agent may alter the program data to simulate an error and then return false to indicate an error condition.

In some embodiments, an agent can be registered using a designated agent registration function. In certain embodiments, the agent registration function may accept a unique agent identifier and a reference to a callback function. In some embodiments, the agent registration function may accept an initial state parameter, which is used to initialize the agent's current state. In certain embodiments, the initial state may default to DO_NOTHING. In certain embodiments, the agent registration function may accept a description parameter used to describe the agent.

In one embodiment, the following example may illustrate how an agent may be registered within a program:

```
bool manipulate_read_result(agent *agent,
                            bool io_cond,
                            void *page) {
    switch (agent->current state) {
        case ONE_TIME_ERROR:
            agent->current_state = DO_NOTHING;
            ((char*)page) [55] = 0xff;
            return FALSE;
        case RANDOM_FALSE_POSITIVES:
            if ((get_timestamp( ) & 0xfff) < (17)) {
                ((char*)page) [55] = 0xff;
                return TRUE;
            }
            break;
        case CONTINUOUS_ERRORS:
            ((char*)page) [55] = 0xff;
            return FALSE;
    }
    return io_cond;
}
register_agent(&manipulate_read_result, // callback function
               "manipulate_read_result", // agent id
               "Manipulate an I/O read result", // description
               DO_NOTHING); // initial agent state
```

In a particular embodiment, the following example may illustrate how the agent registered above can be used to simulate I/O errors and to manipulate program flow:
res=io_read(fd, &page, 4096);
if (!WRAP(res==SUCCESS, "manipulate_read_result", page)) {
    p_response→res=PAGE_FAILURE;
} else {
    p_response→res=PAGE_SUCCESS;
}

In the above example, the branch conditional would normally evaluate to true if and only if the I/O call ("io_read") was successful. However, if the wrapper is enabled, the branch conditional and the program data ("page") can be manipulated by the agent ("change_result_or_page") according to the agent's current state.

Referring back to the embodiment FIG. 2, in response to the agent being invoked, the program's internal data and flow may be changed (blocks 206, 208), as illustrated above. In certain embodiments, an agent may change program data in order to generate load within the system; thus, not only can the program's flow be changed, but the data that is processed during a given flow may be varied, providing additional ways to test a system.

Referring to FIG. 3, a method 300 can be used to change the current state of an agent within a program, according to one embodiment. At block 302, the request is received. In some embodiments, the request may include a unique identifier for the agent along with a new state for the agent. In certain embodiments, the new state may be specified as an enumerated value (e.g., ONE_TIME_ERROR).

In some embodiments, the request may be received from an external program or process. In certain embodiments, an external program/process may use inter-process communication (IPC) to send the request. In a particular embodiment, the request may be sent via a socket on which the program polls or otherwise listens. In certain embodiments, the program may be multithreaded and one of the threads may be used to listen for state change requests. In some embodiments, the request may be sent via shared memory.

Referring again to FIG. 3, at block 304, the agent is retrieved using the unique identifier within the request. In some embodiments, the agent is retrieved using a lookup table (e.g., a hash table). At block 306, the agent's current state is updated based on the new state information within the request.

In many embodiments, the techniques described above can enable a data storage system to reach desired program flows quickly without building complex mockup models or without running the system for a long time before the flows are reached. In some embodiments, the techniques can reduce time and costs associated with testing complex systems as compared with existing techniques. In certain embodiments, the techniques can be used to change internal flows of data inside a system without changing the external behavior of the system. In some embodiments, the techniques can be used to inject errors into a program, i.e., causing the system to act as if an error has occurred. In many embodiments, the techniques can be used to alter a program's behavior dynamically, without having to recompile or reload code. In some embodiments, internal program state can be manipulated at specific times coordinated with other system events.

In some embodiments, the techniques described above may be extended to collect statistics on program flows. In certain embodiments, the wrapper and/or callback functions may maintain a unique counter, counting the number of times specific branch points are reached. In particular embodiments, the counters may be saved in shared memory such that they are accessible to external programs (e.g. external reporting scripts). In many embodiments, the collected statistics may be used to generate a flow chart describing the program's flows and the probability of each flow being reached during program operation. In certain embodiments, the statistics can be used to monitor the effect that changing certain program states have on the overall program flow.

In some embodiments, an external script may use one or more of the techniques described herein to stress test a data storage system or other complex system and identify error conditions more quickly than they might occur during normal operation. In certain embodiments, the external script may iterate through many different internal program states. In particular embodiments, the external script may maintain internal state that represents portions of the program's expected internal state.

In various embodiments, the techniques described herein may be used to test a program's tolerance to unexpected termination. In some embodiments, a program may be expected to recover from unexpected terminations during transaction processing, e.g., when the program restarts, the transaction should be automatically rolled back or completed. In many embodiments, the techniques described herein can be used to deterministically terminate the program after non-volatile updates to critical program data structures.

In certain embodiments, the techniques described herein may be used to test a system's ability to detect and handle data corruption in disk or other storage. In some embodiments, techniques described herein may be used to alter data after an I/O read but before a checksum computation. In many embodiments, the techniques can be used to verify that the system retries the read with parity column(s) and is able to correct the "corrupted" data on disk upon checksum success.

Figure 4:
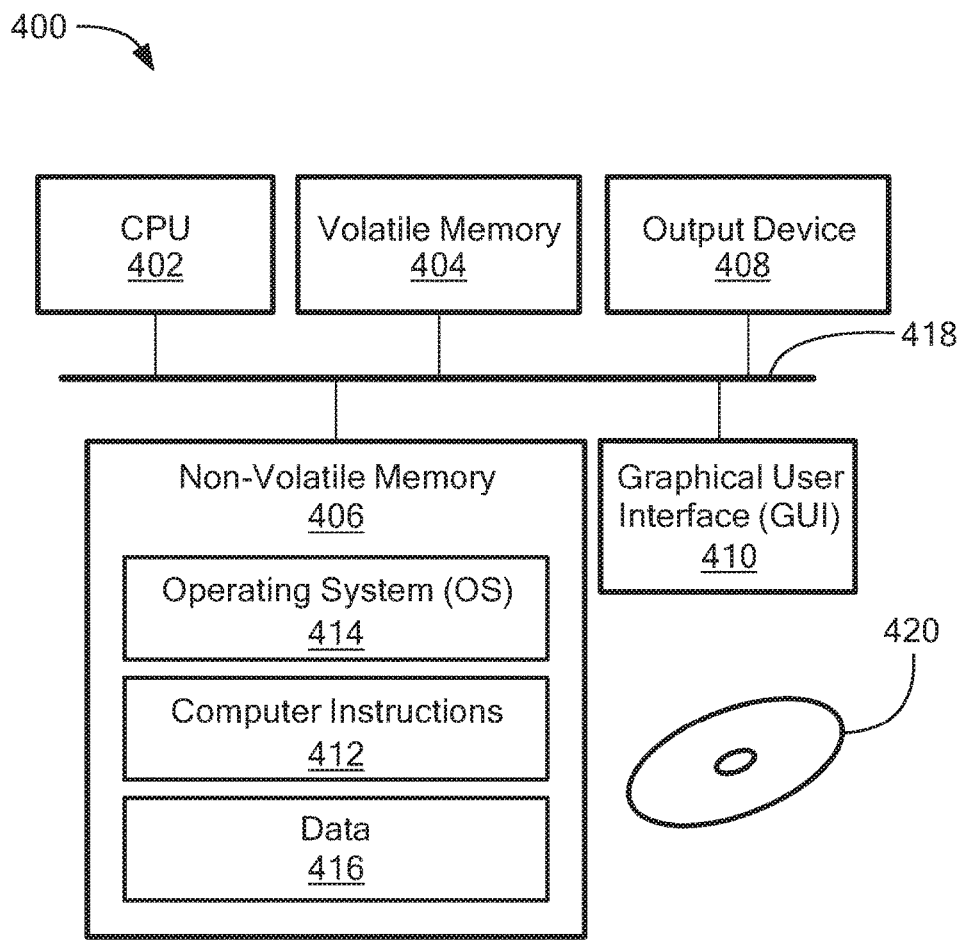
FIG. 4 is block diagram of a computer on which the processing of FIGS. 2 and 3 may be implemented, according to an embodiment of the disclosure.

FIG. 4 shows an illustrative computer 400 that can perform at least part of the processing described herein, according to an embodiment of the disclosure. The computer 400 may include a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 may be configured to store computer instructions 412, an operating system 414, and data 416. In one example, the computer instructions 412 are executed by the processor 402 out of volatile memory 404. In one embodiment, an article 420 comprises non-transitory computer-readable instructions. In some embodiments, the computer 400 corresponds to a virtual machine (VM). In other embodiments, the computer 400 corresponds to a physical computer.

In some embodiments, the computer may include shared memory, sockets, and/or other IPC mechanisms that can be used to externally control and trigger agents within a program.

Referring again to FIG. 4, processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
   registering one or more agents within a program, wherein each agent is located along an execution path of the program and is configured to change the program's internal state; and
   executing at least one of the agents in response to an execution of the program reaching a conditional expression that is wrapped in a wrapper,
   wherein executing the agent includes providing the wrapper with an identifier corresponding to the agent, and
   wherein the wrapper is configured to identify a callback function corresponding to the agent based on the identifier, execute the callback function, and change a flow of the program based on a value that is returned by the callback function.

2. The method of claim 1 wherein executing the at least one of the agents includes changing internal data of the program.

3. The method of claim 1 wherein each of the agents has a current state, wherein executing the at least one of the agents comprises changing the program's internal state based upon the agent's current state.

4. The method according to claim 1, wherein:
   the agent includes a current state having an enumerated value,
   the enumerated values comprise a do-nothing value and an error value, and
   the error value includes a random false positive value.

5. The method according to claim 1, wherein:
   the agent includes a current state having an enumerated value,
   the enumerated values comprise a do-nothing value and an error value, and
   the error value comprises at least one of a one time error value, a random false positive value and a continuous error value.

6. The method according to claim 1, wherein:
   the agent includes a current state having an enumerated value,
   the enumerated values comprise a do-nothing value and an error value, and
   the error value simulates an error.

7. The method according to claim 1, wherein the agent changes data of the program to generate a data load on a system.

8. The method according to claim 1, the agent changes data of the program to test a tolerance of the program to unexpected termination.

9. A system comprising:
   a processor;
   a volatile memory; and
   a non-volatile memory storing computer program code that when executed on the processor causes the processor to execute a process operable to perform the operations of:
      registering one or more agents within a program, wherein each agent is located along an execution path of the program and is configured to change the program's internal state; and
   executing at least one of the agents in response to an execution of the program reaching a conditional expression that is wrapped in a wrapper,
   wherein executing the agent includes providing the wrapper with an identifier corresponding to the agent, and
   wherein the wrapper is configured to identify a callback function corresponding to the agent based on the identifier, execute the callback function, and change a flow of the program based on a value that is returned by the callback function.

10. The system of claim 9 wherein executing the at least one of the agents includes changing internal data of the program.

11. The system of claim 9, the processor is further operable to perform the operations of:
    receiving a request to change an agent's current state to a new state; and
    updating the agent's current state to the new state,
   wherein the request is generated externally from the program.

12. A computer program product tangibly embodied in a non-transitory computer-readable medium, the computer-readable medium storing program instructions that are executable to:
   register one or more agents within a program, wherein each agent is located along an execution path of the program and is configured to change the program's internal state; and
   execute at least one of the agents in response to an execution of the program reaching a conditional expression that is wrapped in a wrapper,
   wherein executing the agent includes providing the wrapper with an identifier corresponding to the agent, and
   wherein the wrapper is configured to identify a callback function corresponding to the agent based on the identifier, execute the callback function, and change a flow of the program based on a value that is returned by the callback function.

13. The computer program product of claim 12 wherein executing the at least one of the agents includes changing internal data of the program.

* * * * *